(12) United States Patent
Mucino Hernandez (10) Patent No.: US 11,884,211 B2
(45) Date of Patent: Jan. 30, 2024

(54) VEHICLE SIDE MIRROR

(71) Applicant: Nissan North America, Inc., Franklin, TN (US)

(72) Inventor: Sergio Carlos Mucino Hernandez, Mexico City (MX)

(73) Assignee: Nissan North America, Inc., Franklin, TN (US)

( * ) Notice: Subject to any disclaimer, the term of this patent is extended or adjusted under 35 U.S.C. 154(b) by 119 days.

(21) Appl. No.: 17/616,175

(22) PCT Filed: Jun. 4, 2019

(86) PCT No.: PCT/US2019/035438
§ 371 (c)(1),
(2) Date: Dec. 2, 2021

(87) PCT Pub. No.: WO2020/246967
PCT Pub. Date: Dec. 10, 2020

(65) Prior Publication Data
US 2022/0305994 A1    Sep. 29, 2022

(51) Int. Cl.
B60R 1/062    (2006.01)
(52) U.S. Cl.
CPC ................... B60R 1/062 (2013.01)
(58) Field of Classification Search
CPC .......... B60R 1/062; B60R 1/072; B60R 1/074
USPC ....................... 359/841, 842, 877
See application file for complete search history.

(56) References Cited

U.S. PATENT DOCUMENTS

| 2,724,996 | A | * | 11/1955 | O'Shei | B60R 1/06 248/475.1 |
| 2,775,919 | A | * | 1/1957 | Fischer | B60R 1/06 248/478 |
| 4,234,153 | A | * | 11/1980 | Chihara | B60R 1/076 248/548 |
| 4,253,633 | A | * | 3/1981 | Takegawa | B60R 1/06 248/222.12 |
| 4,711,421 | A | * | 12/1987 | Mittelhauser | B60R 1/076 359/872 |
| 6,039,449 | A | * | 3/2000 | Dolan | B60R 1/06 359/872 |
| 6,371,619 | B1 | * | 4/2002 | Assinder | B60R 1/07 248/478 |

(Continued)

FOREIGN PATENT DOCUMENTS

WO    2017153649 A1    9/2017

OTHER PUBLICATIONS

International Search Report in PCT/US2019/35438 dated Aug. 9, 2019.
Written Opinion, dated Aug. 9, 2019.

*Primary Examiner* — Ricky D Shafer
(74) *Attorney, Agent, or Firm* — Global IP Counselors, LLP (57) ABSTRACT

A vehicle side mirror includes a base member and a mirror housing movably connected to the base member. The mirror housing includes a mirror and a mounting bracket connected to the base member and configured to mount the vehicle side mirror to a door panel of a vehicle. The mounting bracket includes a pivot surface on which the mounting bracket is configured to pivot with respect to a door panel of the vehicle. A flexible attachment member is configured to secure the mounting bracket to the door panel after being pivoted on the pivot surface.

17 Claims, 10 Drawing Sheets

(56) References Cited

U.S. PATENT DOCUMENTS

| | | | | |
|---|---|---|---|---|
| 6,488,382 B1* | 12/2002 | Mertens | ............... | B60R 1/06 |
| | | | | 248/478 |
| 8,690,363 B2* | 4/2014 | Hamada | ............... | B60R 1/06 |
| | | | | 359/514 |
| 8,936,372 B2 | 1/2015 | Kaneko | | |
| 2005/0083596 A1* | 4/2005 | Jang | ............... | B60R 1/06 |
| | | | | 359/879 |
| 2012/0235009 A1* | 9/2012 | Horie | ............... | B60R 1/06 |
| | | | | 248/475.1 |

* cited by examiner

VEHICLE SIDE MIRROR

BACKGROUND

Field of the Invention

The present invention generally relates to a vehicle side mirror. More specifically, the present invention relates to a mounting bracket that temporarily secures a vehicle side mirror to a vehicle door panel prior to finalizing mounting of the vehicle side mirror to the vehicle door panel.

Background Information

When a vehicle side mirror is secured to a vehicle door panel on an assembly line, an installer uses one hand to hold the vehicle side mirror in a proper position for installation and the other hand to complete the installation. The installer must manipulate fasteners and a tool to complete the installation with other hand. Accordingly, installation of the vehicle side mirror to the vehicle door panel can be difficult.

SUMMARY

An object of the disclosure is to provide a mounting bracket for a vehicle side mirror configured to temporarily secure the vehicle side mirror in a proper position for installation, thereby allowing the installer to use both hands to mount the vehicle side mirror.

In view of the state of the known technology, one aspect of the present disclosure is to provide a vehicle side mirror including a base member and a mirror housing movably connected to the base member. The mirror housing includes a mirror and a mounting bracket connected to the base member and configured to mount the vehicle side mirror to a door panel of a vehicle. The mounting bracket includes a pivot surface on which the mounting bracket is configured to pivot with respect to a door panel of the vehicle. A flexible attachment member is configured to secure the mounting bracket to the door panel after being pivoted on the pivot surface.

Another aspect of the present invention includes a vehicle side mirror for a vehicle. The vehicle includes a door panel having an inner door panel and an outer door panel, and a cavity defined between the inner and outer door panels. A vehicle side mirror is connected to the door panel. The vehicle side mirror includes a base member and a mirror housing movably connected to the base member. The mirror housing includes a mirror, and a mounting bracket connected to the base member. The mounting bracket includes a pivot surface on which the mounting bracket is configured to pivot on the outer door panel during installation of the vehicle side mirror. A flexible attachment member is configured to secure the mounting bracket to the outer door panel after being pivoted on the pivot surface.

Another aspect of the present invention includes a method of installing a vehicle side mirror to a vehicle. A pivot surface of a mounting bracket is disposed on an outer door panel of a door panel of the vehicle. The mounting bracket is pivoted on the pivot surface. A flexible attachment member of the mounting bracket is flexed as the flexible attachment member passes through an opening in the outer door panel. The flexible attachment member is engaged with the outer door panel to secure the vehicle side mirror the door panel of the vehicle.

Also other objects, features, aspects and advantages of the disclosed vehicle side mirror will become apparent to those skilled in the art from the following detailed description, which, taken in conjunction with the annexed drawings, discloses exemplary embodiments of the vehicle side mirror.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Referring initially to FIGS. 1-15, a vehicle side mirror assembly 10 is illustrated in accordance with an exemplary embodiment of the present invention. The vehicle side mirror assembly 10 includes a vehicle side mirror 12 connected to a vehicle structure, such as a door panel 14, of a vehicle 16.

Figure 7:
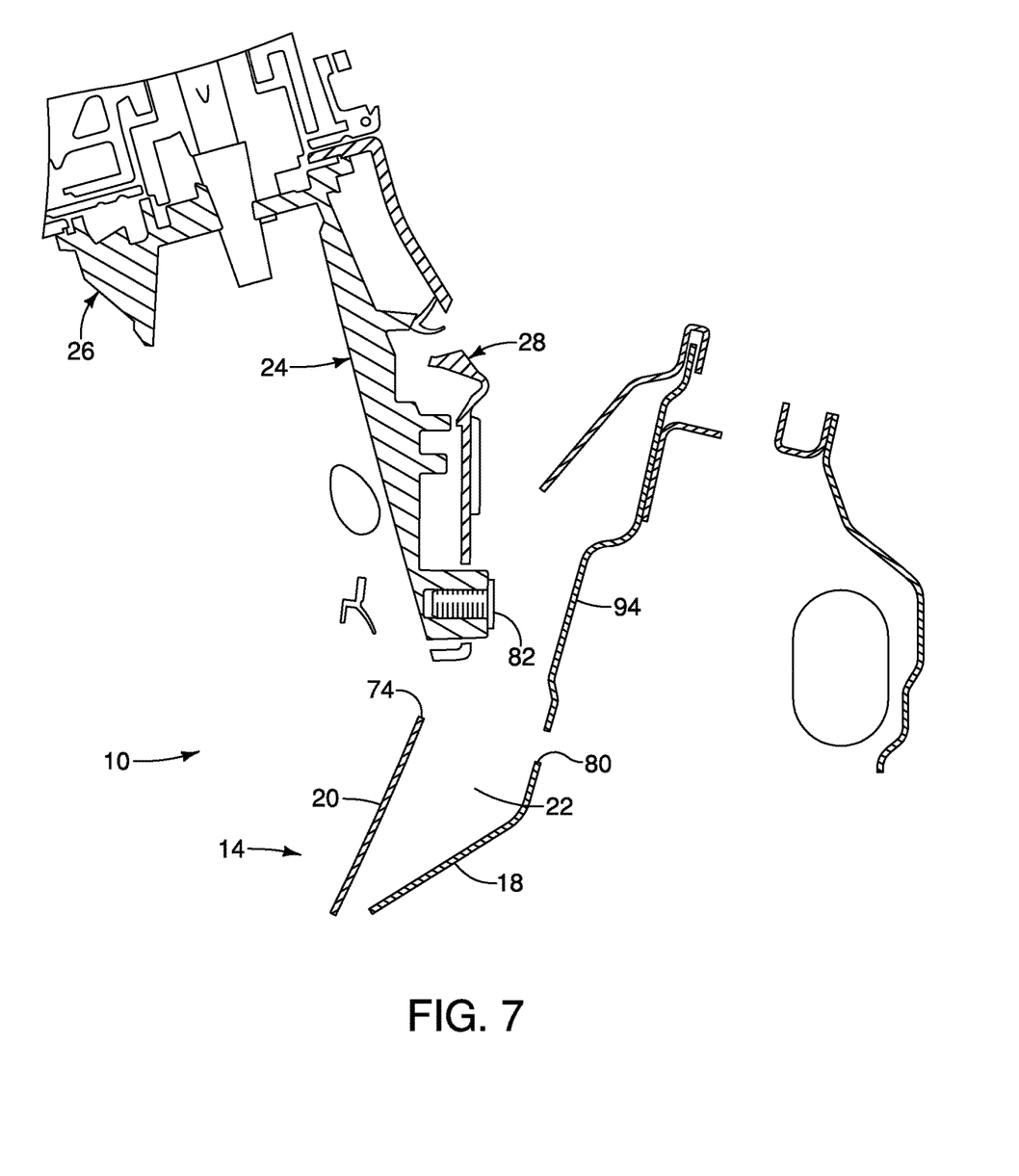
FIG. 7 is a side elevational view in cross section of the vehicle side mirror of FIG. 1 prior to being temporarily secured to a vehicle door panel.
Figure 8:
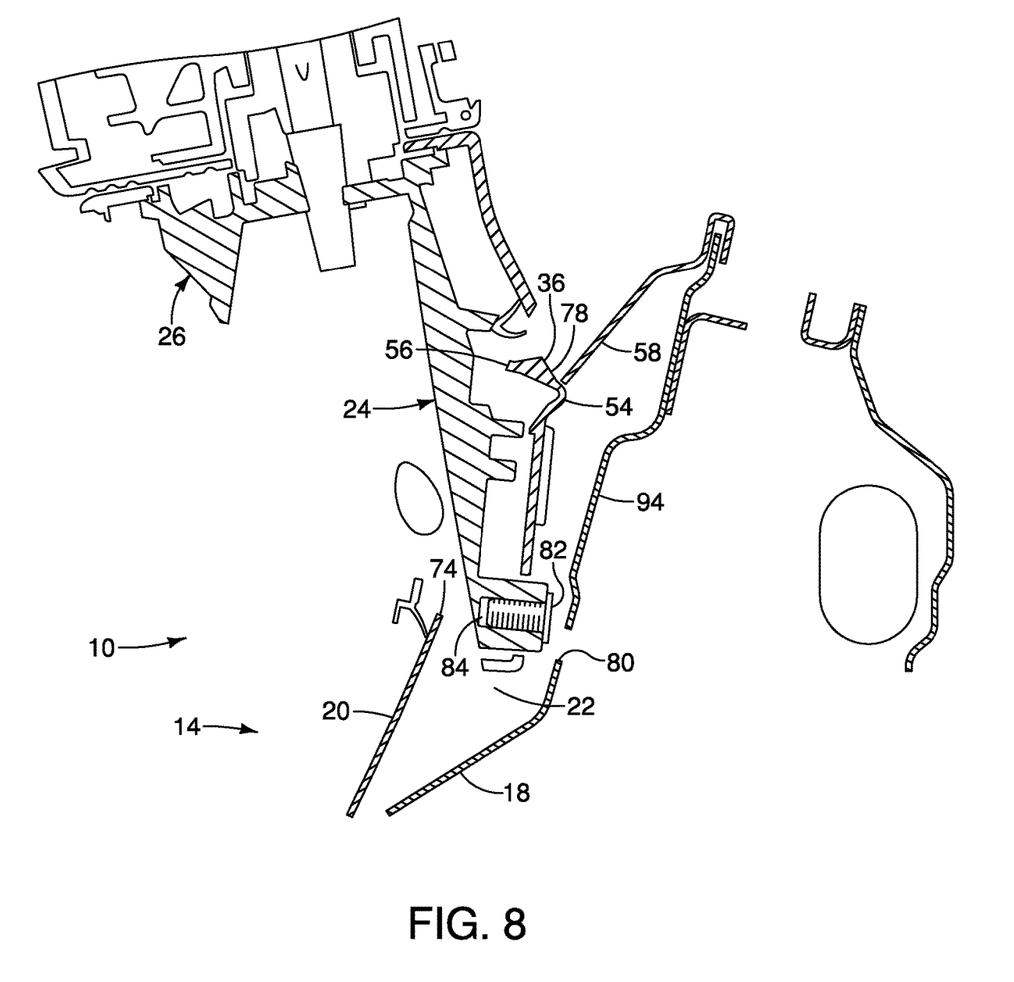
FIG. 8 is a side elevational view in cross section of the vehicle side mirror of FIG. 1 during pivotal movement to a temporary installation position.
Figure 9:
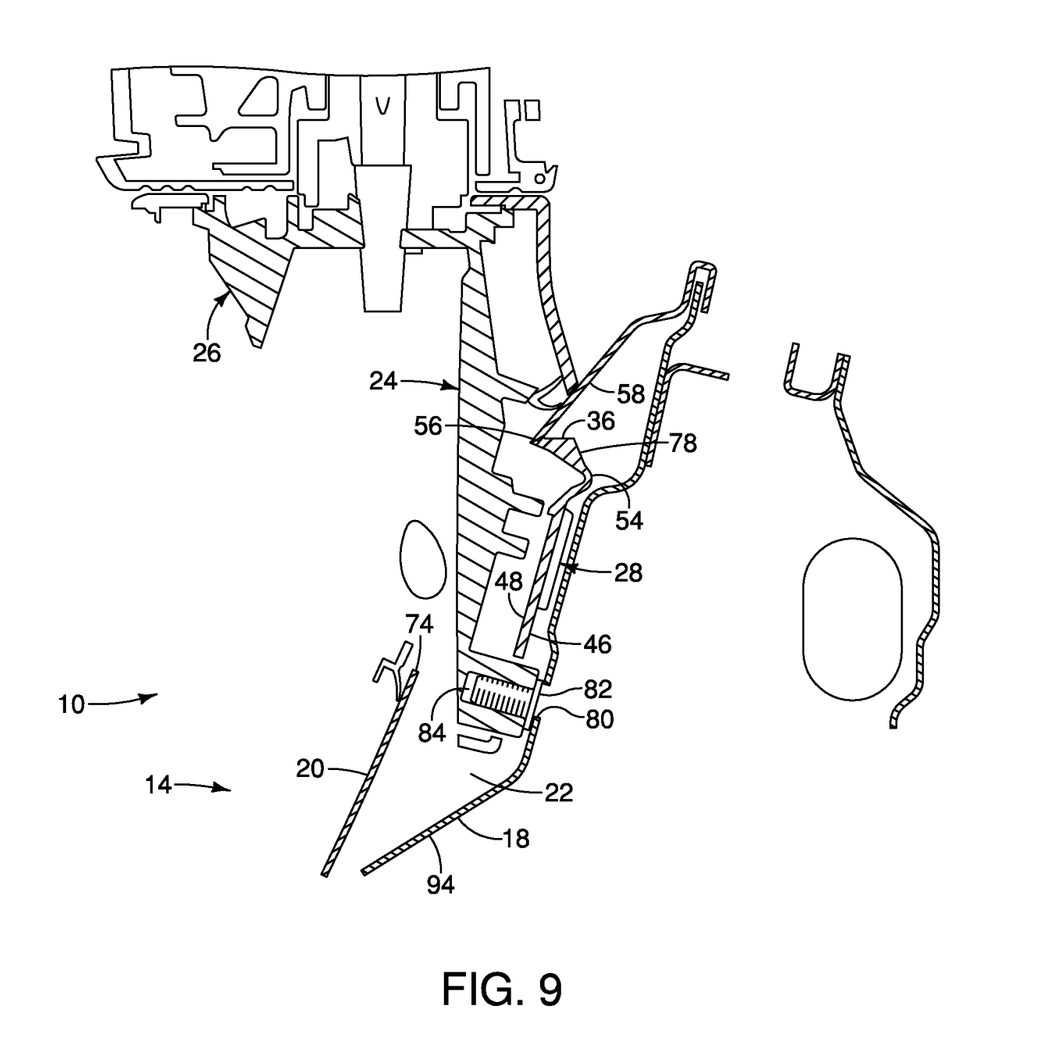
FIG. 9 is a side elevational view in cross section of the vehicle side mirror of FIG. 1 temporarily secured to a vehicle door panel.

The vehicle door panel 14 includes an inner door panel 18 and an outer door panel 20, as shown in FIGS. 7-9. A cavity 22 is defined between the inner and the outer door panels 18 and 20, respectively.

Figure 2:
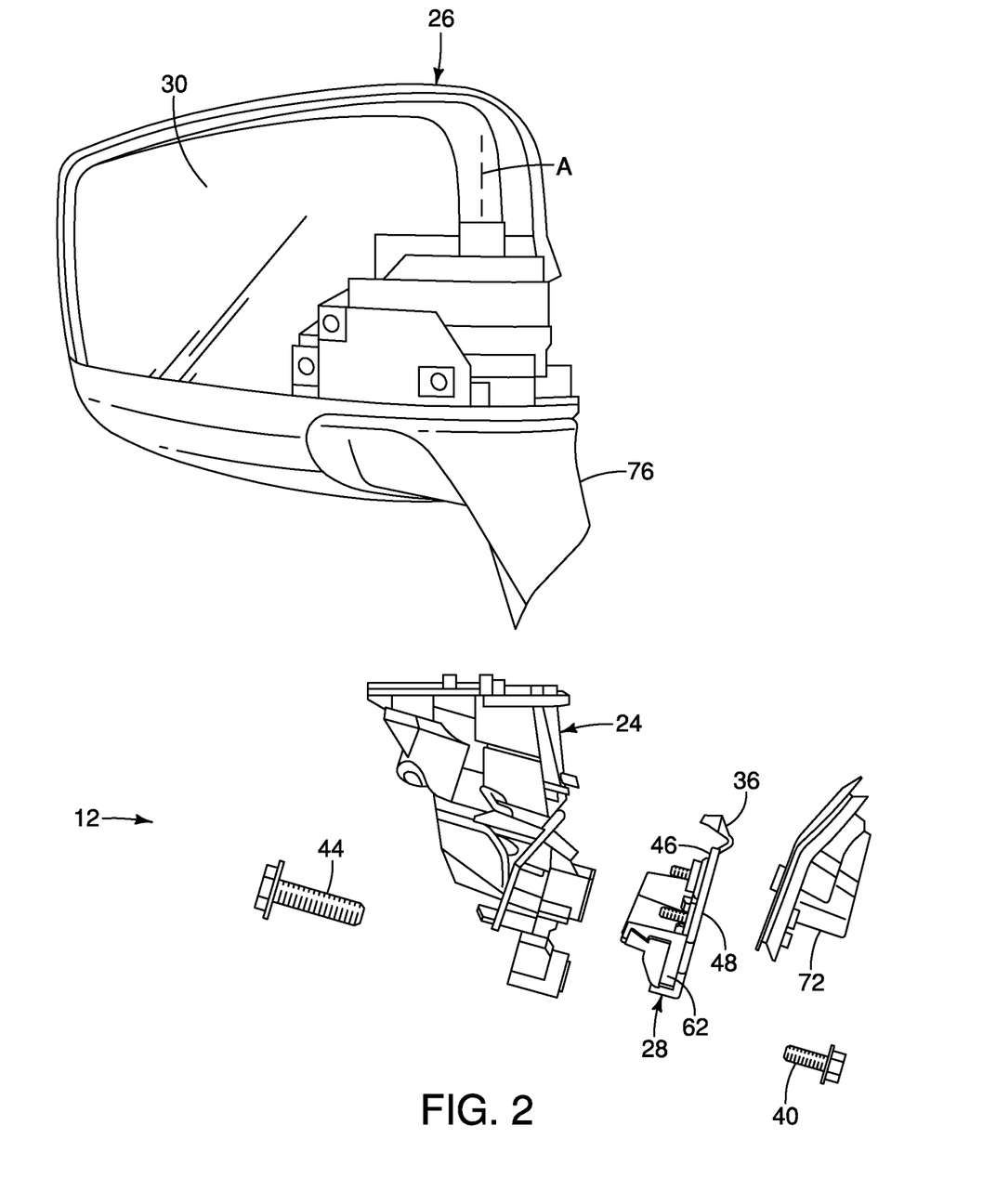
FIG. 2 is an exploded perspective view of the vehicle side mirror of FIG. 1.

The vehicle side mirror 12 is connected to the door panel 14, as shown in FIGS. 10-15. The vehicle side mirror 12 includes a base member 24, a mirror housing 26 and a mounting bracket 28, as shown in FIG. 2. The mirror housing 26 is movably connected to the base member 24 and includes a mirror 30. Electrical wiring 32 electrically connects the mirror housing 26 to an operating member disposed within the vehicle cabin such that the orientation of the mirror housing 24 is controllable from within the vehicle cabin. The electrical wiring supplies electrical power and control signals to the vehicle side mirror 12. The mirror housing 24 is movable with respect to the base member 24 about an axis A responsive to the received power and control signals.

The mounting bracket 28 is connected to the base member 24, as shown in FIGS. 7 and 10-15. The mounting bracket 28 is configured to mount the vehicle side mirror 12 to the door panel 14 of the vehicle 16. The mounting bracket 28 includes a pivot surface 34 and a flexible attachment member 36. The mounting bracket 28 is configured to pivot on the pivot surface 34 with respect to the door panel 14 of the vehicle 16. The flexible attachment member 36 is configured to secure the mounting bracket 28 to the door panel 14 after being pivoted on the pivot surface 34.

Figure 12:
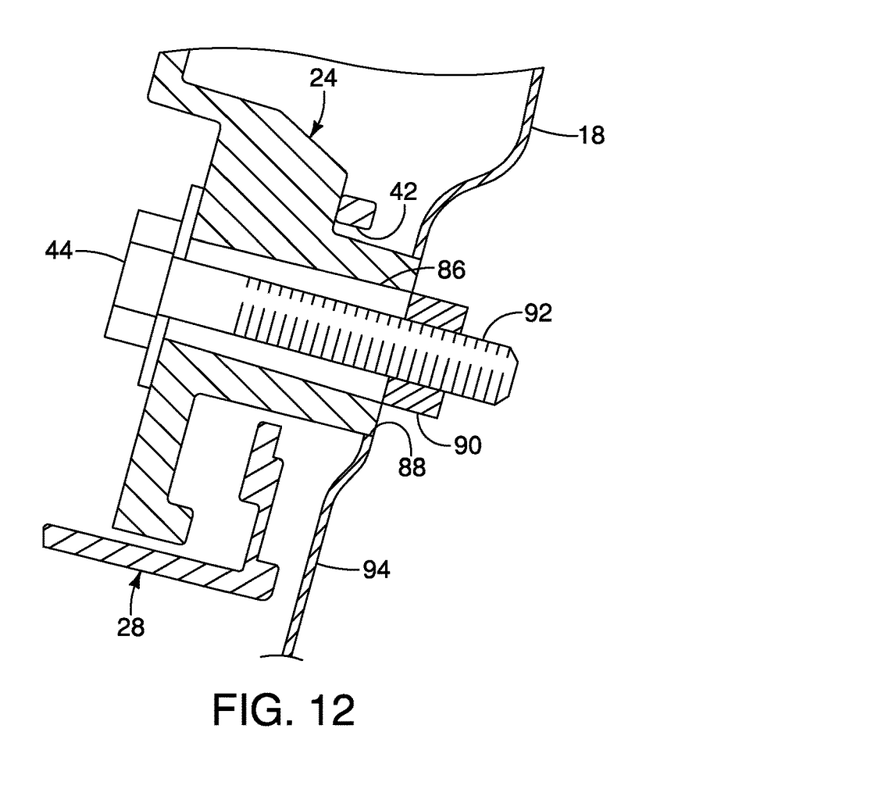
FIG. 12 is side elevational view in cross section of the vehicle side mirror taken along line 12-12 of FIG. 10.

The mounting bracket 28 includes a plurality of fastener holes to secure the side mirror 12 to the door panel 14 of the vehicle 16. A first fastener hole 38 is disposed in the mounting bracket 28 and receives a first fastener 40 to secure the mounting bracket 28 to the door panel 14, as shown in FIG. 12. A second fastener hole 42 is disposed in the mounting bracket 28 and receives a second fastener 44 to secure the vehicle side mirror 12 to the door panel 14 of the vehicle 16.

Figure 3:
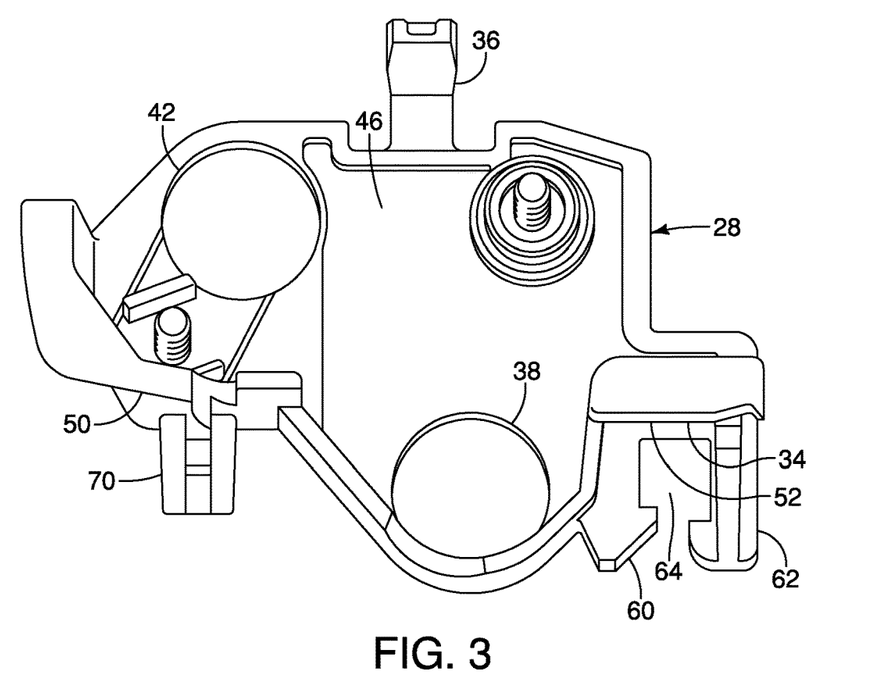
FIG. 3 is a front elevational view of a mounting bracket of FIG. 2.
Figure 4:
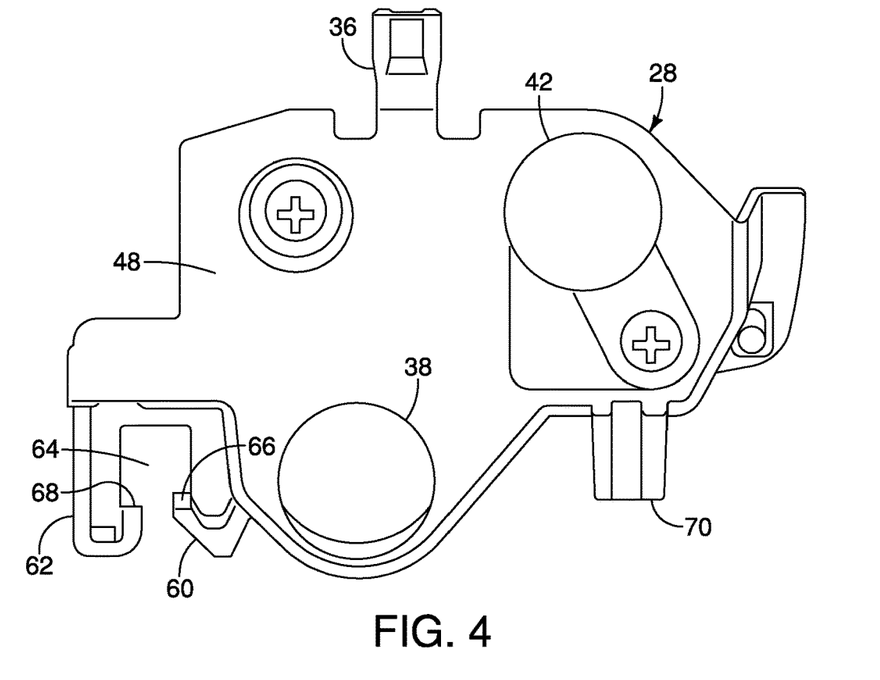
FIG. 4 is a rear elevational view of the mounting bracket of FIG. 2.
Figure 13:
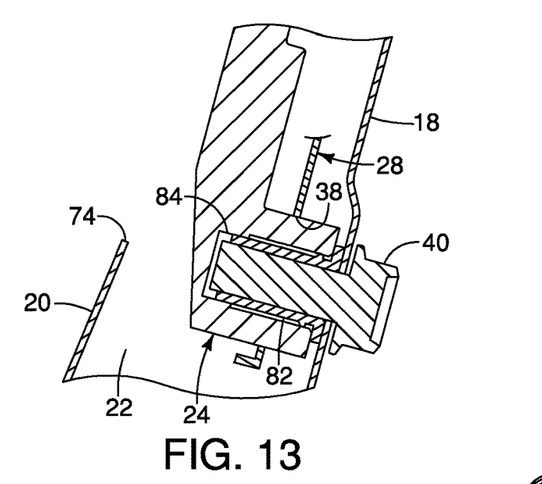
FIG. 13 is side elevational view in cross section of the vehicle side mirror taken along line 13-13 of FIG. 10.

The first and second fastener holes 38 and 42 extend from a first, or outer, surface 46 to a second, or inner, surface 48 of the mounting bracket 28, as shown in FIGS. 3 and 4. As shown in FIG. 9, when the mounting bracket 28 is in an installed position, the first surface 46 faces the outer door panel 20 and the second surface 48 faces the inner door panel 18. When the vehicle side mirror 12 is installed to the door panel 14, the first fastener 40 is received by the mounting bracket 28, the base member 24 and the inner door panel 18, as shown in FIG. 13. When the vehicle side mirror 12 is installed to the door panel 14, the second fastener 44 is received by the mounting bracket 28, the base member 24 and the inner door panel 18, as shown in FIG. 12.

Figure 11:
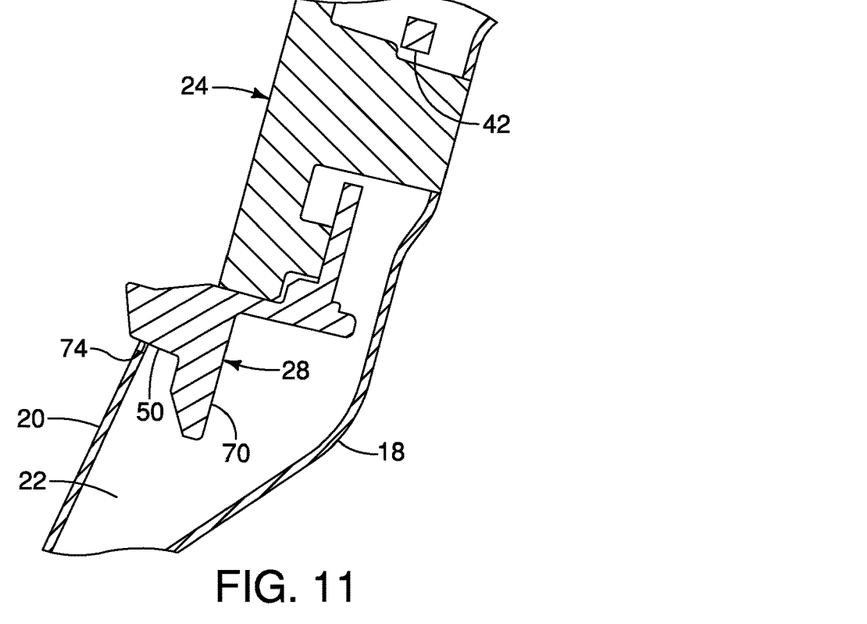
FIG. 11 is side elevational view in cross section of the vehicle side mirror taken along line 11-11 of FIG. 10.
Figure 15:
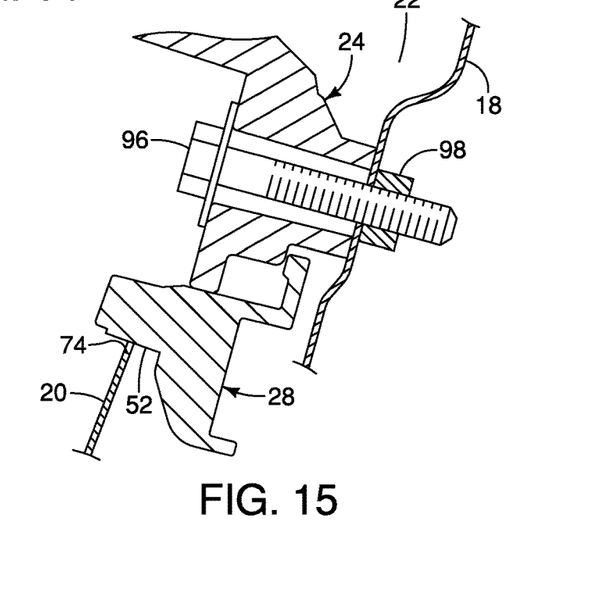
FIG. 15 is side elevational view in cross section of the vehicle side mirror taken along line 15-15 of FIG. 10.

The pivot surface 34 includes a first pivot surface portion 50 and a second pivot surface portion 52, as shown in FIG. 3. The pivot surface 34 extends outwardly from the first surface 46 of the mounting bracket 28. The first and second pivot surface portions 50 and 52 are disposed on opposite sides of the first fastener hole 38. The first fastener hole 38 is disposed lower than the pivot surface 34. The first fastener hole 38 is disposed lower than the first pivot surface portion 50 and the second pivot surface portion 52. The second fastener hole 42 is disposed above the pivot surface 34. The second fastener hole 42 is disposed above the first pivot surface portion 50 and the second pivot surface portion 52. As shown in FIGS. 11 and 15, the first and second pivot surface portions 50 and 52 of the pivot surface portion 34 contact the outer door panel 20 such that the mounting bracket 28 pivots on the outer door panel 20 during installation of the vehicle side mirror 12.

Figure 5:
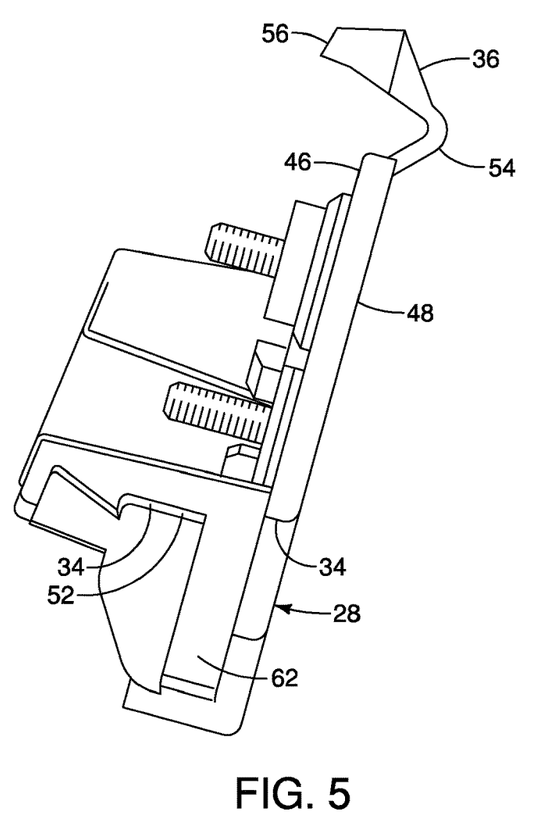
FIG. 5 is a side elevational view of the mounting bracket of FIG. 2.
Figure 6:
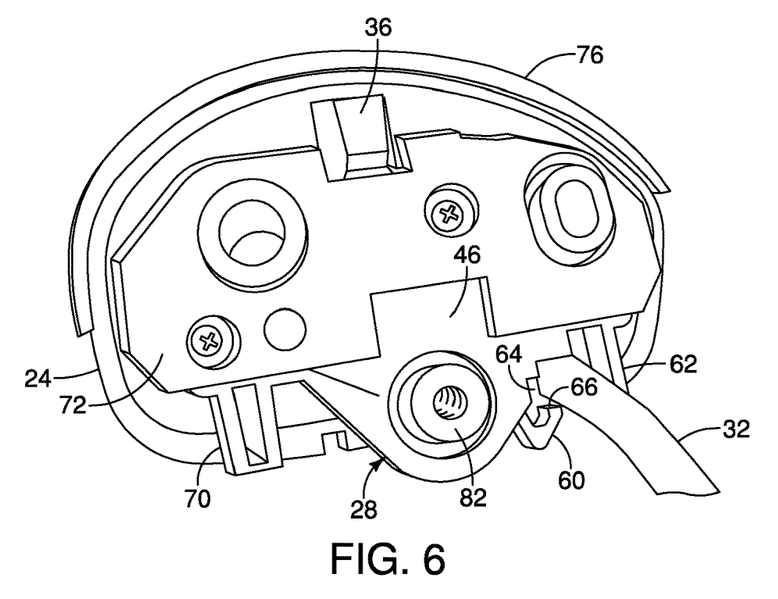
FIG. 6 is a front elevational view of the vehicle side mirror of FIG. 1 prior to being temporarily secured to a vehicle door panel.

The flexible attachment member 36 extends outwardly from the mounting bracket 28, as shown in FIGS. 4-6. The flexible attachment member 36 includes a curved portion 54 and a contact surface 56. The curved portion 54 facilitates flexing of the flexible attachment member during installation of the vehicle side mirror 12, as shown in FIG. 8. The contact portion 56 contacts an inner surface 58 of the outer door panel 20, as shown in FIG. 9, to facilitate temporarily securing the vehicle side mirror 12 to the door panel 14. The contact portion 56 contacts the inner surface 58 of the outer door panel 20 after pivoting the mounting bracket 28 on the outer door panel 20, as shown in FIGS. 7-9. The inner surface 58 of the outer door panel 20 faces the cavity 22.

A wire support member 60 and a wire support leg 62 define a wire receiving recess 64 in the mounting bracket 28, as shown in FIGS. 3 and 4. The wire support member 60 has a first wire contacting surface 66 and the wire support leg 62 has a second wire contacting surface 68. As shown in FIG. 6, the wire receiving recess 64 receives the electrical wiring 32 routed to the mirror housing 26 that supplied power and control signals to the vehicle side mirror 12. The wire support leg 62 flexes to facilitate inserting the electrical wiring 32 in the wire receiving recess 64. The first and second wire contacting surfaces 66 and 68 facilitate retaining the electrical wiring 32 in the wiring receiving recess 64. The wire support member 60 and the wire support leg 62 are disposed lower than the pivot surface 34, as shown in FIG. 3. The wire support member 60 and the wire support leg 62 are disposed beneath the second pivot portion 52.

A support member 70 extends downwardly from the pivot surface 34, as shown in FIG. 3. The support member 70 is disposed in the cavity 22 when the pivot surface 34 is pivoted on the outer door panel 20. The support member 70 supports the mounting bracket 28 by providing a surface within the cavity 22 to facilitate pivoting the mounting bracket 28 during installation of the vehicle side mirror 12.

The mounting bracket 28 is preferably unitarily formed as a one-piece member. Preferably, the mounting bracket 28 is made of plastic. The mounting bracket 28 can be made of acrylonitrile butadiene styrene (ABS) by an injection molding process.

Figure 1:
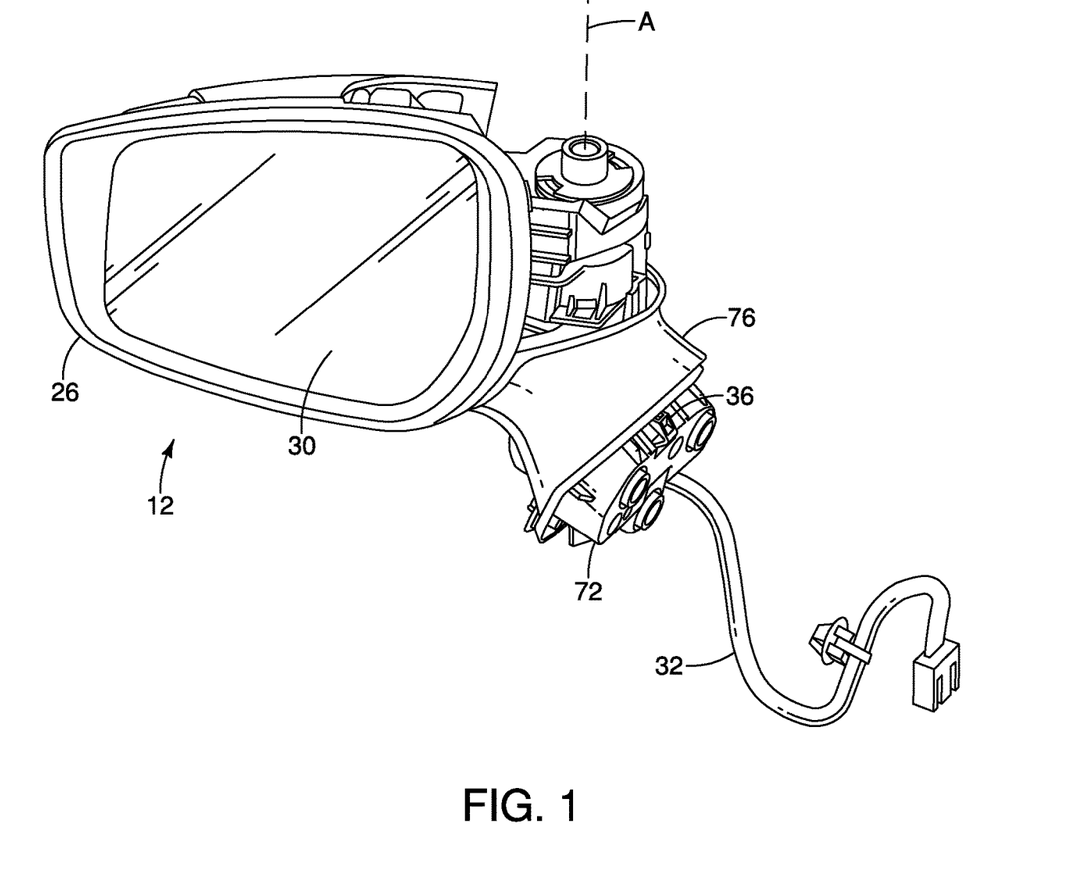
FIG. 1 is a perspective view of a vehicle side mirror in accordance with an exemplary embodiment of the present invention.

A sealing member, such as a gasket 72, is connected to the vehicle side mirror 12 to facilitate sealing an opening 74 (FIG. 7) in the outer door panel 20 through which the vehicle side mirror 12 is installed, as shown in FIGS. 1, 2 and 6. The mounting bracket 28 is disposed between the base member 24 and the gasket 72. The gasket 72 is not shown in FIGS. 7-9 and 11-15 for clarity regarding installation of the vehicle side mirror 12.

The mirror housing 26 includes a base member cover 76, as shown in FIGS. 1, 2, 6 and 10, that covers the base member 24 disposed externally of the vehicle door panel 14. The base member cover 76 protects the base member 24 after the vehicle side mirror 12 is mounted to the vehicle 16.

Figure 10:
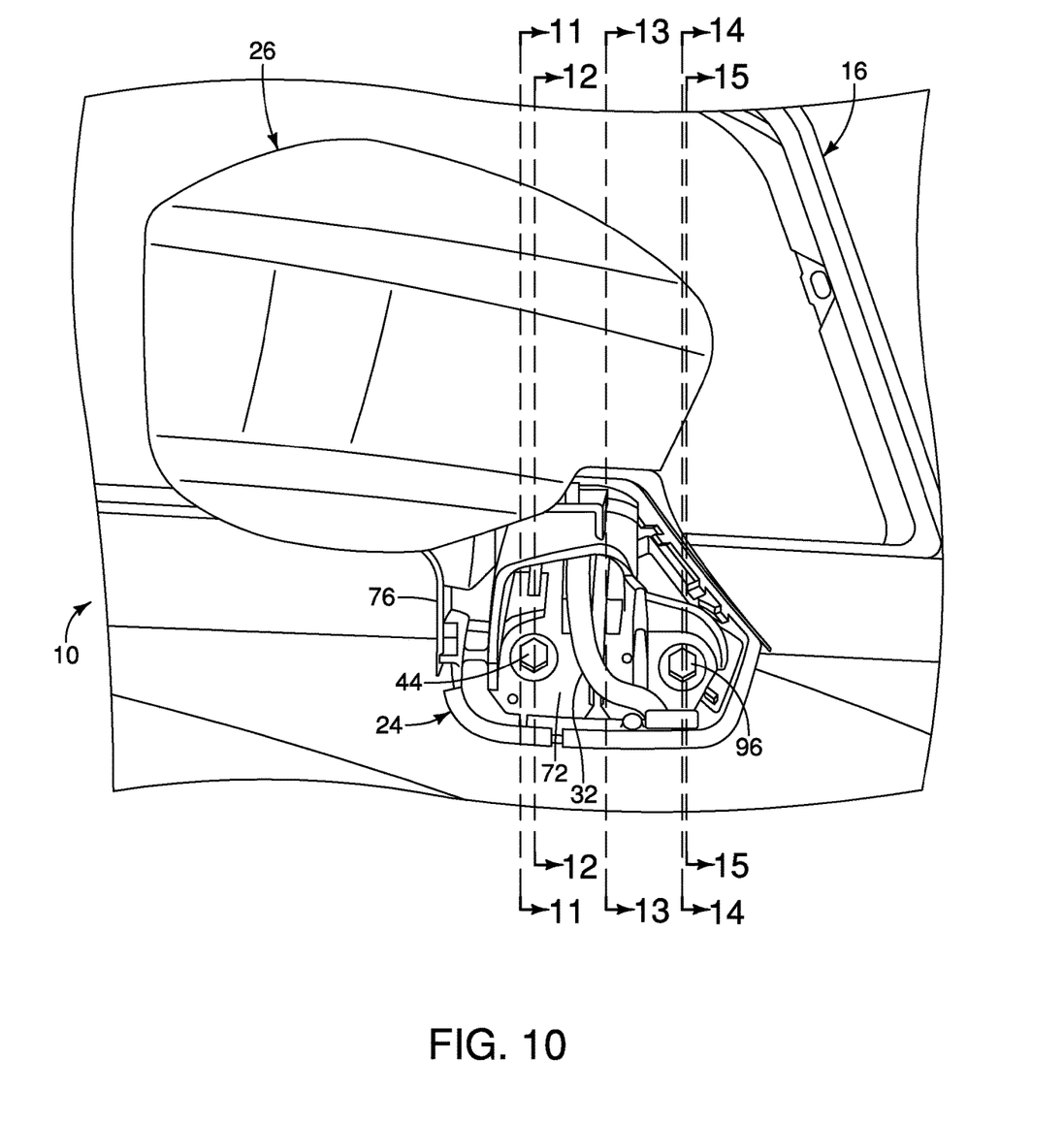
FIG. 10 is a side elevational view of the vehicle side mirror secured to the vehicle door panel.

Installation of the vehicle side mirror 12 is illustrated in FIGS. 6-15. The assembled base member 24, mounting bracket 28 and gasket 72 of the vehicle side mirror 12 are shown in FIG. 6. The lower end of the mounting bracket 28 is inserted through the opening 74 in the outer door panel 20, as shown in FIG. 7. The pivot surface 34 of the mounting bracket 28 is disposed on the outer door panel 20 of the door panel 14 of the vehicle 16 (FIG. 10). As shown in FIG. 11, the first pivot surface portion 50 is disposed on a lower edge of the outer door panel 20 defining the outer door panel opening 74. As shown in FIG. 15, the second pivot surface portion 52 is disposed on the lower edge of the outer door panel 20 defining the outer door panel opening 74. The first fastener hole 38 and the support member 70 are disposed in the cavity 22, as shown in FIGS. 8 and 11.

The mounting bracket 28 is then pivoted on the pivot surface 34, as shown in FIG. 8. The mounting bracket 28 is pivoted on the first and second pivot surface portions 50 and 52 in a clockwise direction as shown in FIG. 8. The mounting bracket 28 is pivoted in a direction to engage the flexible attachment member 36 with an upper edge of the outer door panel opening 74. The upper edge of the outer door panel opening 74 contacts a ramped surface 78 of the flexible attachment member 36, thereby causing the curved portion 54 of the flexible attachment member 36 to flex as the flexible attachment member 36 passes through the outer door panel opening 74. The first and second pivot surface portions 50 and 52 of the pivot surface 34 support the mounting bracket 28 during the pivotal movement. The support member 70 is disposed in the cavity 22 and further supports the mounting bracket 28 during the pivotal movement.

Continued pivotal movement of the mounting bracket 28 causes the upper edge of the outer door panel opening 74 to slide along the ramped surface 78 until the flexible attachment member 36 passes through the outer door panel opening 74, as shown in FIG. 9. As the flexible attachment member 36 passes through the outer door panel opening 74, the flexible attachment member 36 snaps into engagement with the outer door panel 20 to secure the vehicle side mirror 12 to the door panel 14 of the vehicle 16 (FIG. 10). The contact surface 56 of the flexible attachment member 36 engages the inner surface 58 of the outer door panel 20. The first and second pivot surface portions 50 and 52 remain in contact with the lower edge of the outer door panel opening 74 such that the pivot surface 34 and the flexible attachment member 36 of the mounting bracket 28 facilitate securely retaining the vehicle side mirror 12 to the door panel 14 in a temporary installation position. The mounting bracket securely retains the vehicle side mirror 12 in the temporary installation position such that movement and vibration of the assembly line does not disengage the vehicle side mirror 12 from the door panel 14.

When the vehicle side mirror 12 is in the temporary installation position shown in FIG. 9, the installer is free to use both hands to complete the mounting process of mounting the vehicle side mirror 12 to the door panel 14 of the vehicle 16 (FIG. 10), thereby allowing the user to more quickly and easily complete installation of the vehicle side mirror 12. The finalized installation position of the vehicle side mirror 12 is shown in FIG. 10. A first fastener 40 is inserted through a fastener opening 80 in the inner door panel 18, through the first fastener hole 38 in the mounting bracket 28 and into the base member 24, as shown in FIGS. 9 and 13. A threaded sleeve 82 can be disposed in a fastener receiving recess 84 in the base member 24 to receive the first fastener 40. As shown in FIG. 13, the first fastener 40 is inserted in an outboard direction of the vehicle. In other words, the first fastener 40 is inserted in a first direction from the inner door panel 18 towards the outer door panel 20.

A second fastener 44 is inserted through a fastener opening 86 in the base member 24, through the second fastener hole 42 in the mounting bracket 28 and through a fastener opening 88 in the inner door panel 18, as shown in FIGS. 10 and 12. A nut 90, such as a weld nut, can be disposed on a shaft 92 of the second fastener 44 to securely retain the second fastener 44 to the inner door panel 18. The nut 90 engages an inner surface 94 of the inner door panel 18, as shown in FIG. 12. The second fastener 44 is inserted in an inboard direction of the vehicle. In other words, the second fastener 44 is inserted in a second direction from the outer door panel 20 towards the inner door panel 18. The first and second directions are opposite directions, such that the first and second fasteners 40 and 44 are inserted in opposite directions.

Figure 14:
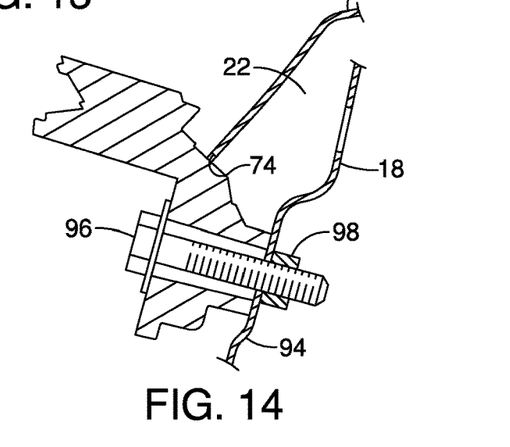
FIG. 14 is side elevational view in cross section of the vehicle side mirror taken along line 14-14 of FIG. 10.

A third fastener 96 is inserted through a fastener opening in the base member 24 and through a fastener opening in the inner door panel 18, as shown in FIGS. 14 and 15. A nut 98, such as a weld nut, can be disposed on a shaft of the third fastener 96 to securely retain the third fastener 96 to the inner door panel 18. The nut 98 engages the inner surface 94 of the inner door panel 18. The third fastener 96 is inserted in the inboard direction of the vehicle. In other words, the third fastener 96 is inserted in the second direction from the outer door panel 20 towards the inner door panel 18. As shown in FIGS. 14 and 15, the third fastener 96 does not pass through the mounting bracket 28.

The first, second and third fasteners 40, 44 and 96 securely mount the vehicle side mirror 12 to the door panel 14 of the vehicle 16, after the mounting bracket 28 has been pivoted to the temporary installation position shown in FIG. 9. The pivot surface 34 and the flexible attachment member 36 secure the vehicle side mirror 12 to the door panel 14 in the temporary installation position shown in FIG. 9 such that the installer can use both hands to insert the first, second and third fasteners 40, 44 and 96, thereby finalizing the installation of the vehicle side mirror 12.

In an alternative embodiment, the mounting bracket 28 can be molded in the base member 24 or the gasket 72, such that the mounting bracket 28 is not a separate member.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion." "member" or "element" when used in the singular can have the dual meaning of a single part or a plurality of parts. Also as used herein to describe the above exemplary embodiment(s), the following directional terms "forward", "rearward", "above", "downward", "vertical", "horizontal", "below" and "transverse" as well as any other similar directional terms refer to those directions of a vehicle equipped with the vehicle side mirror. Accordingly, these terms, as utilized to describe the present invention should be interpreted relative to a vehicle equipped with the vehicle side mirror.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the exemplary embodiments according to the present invention are provided for illustration only, and not for the purpose of limiting the invention as defined by the appended claims and their equivalents.

What is claimed is:

1. A vehicle side mirror comprising:
a base member;
a mirror housing movably connected to the base member, the mirror housing including a mirror; and
a mounting bracket connected to the base member and configured to mount the vehicle side mirror to a door panel of a vehicle, the mounting bracket including
a pivot surface on which the mounting bracket is configured to pivot with respect to a door panel of the vehicle;
a flexible attachment member configured to secure the mounting bracket to the door panel after being pivoted on the pivot surface, the pivot surface being disposed below the flexible attachment member;
a first fastener hole disposed in the mounting bracket; and
a first fastener received by the first fastener hole to secure the mounting bracket to the base member.

2. The vehicle side mirror according to claim 1, wherein the mounting bracket is unitarily formed as a one-piece member.

3. The vehicle side mirror according to claim 1, wherein the mounting bracket is made of plastic.

4. The vehicle side mirror according to claim 1, wherein the first fastener hole is disposed lower than the pivot surface.

5. The vehicle side mirror according to claim 1, wherein the mounting bracket includes a wire support member disposed lower than the pivot surface.

6. The vehicle side mirror according to claim 1, wherein a second fastener hole is disposed in the mounting bracket, the second fastener hole being configured to receive a second fastener to secure the mounting bracket to the base member.

7. The vehicle side mirror according to claim 6, wherein the second fastener hole is disposed above the pivot surface.

8. The vehicle side mirror according to claim 1, wherein the pivot surface includes a first pivot surface portion and a second pivot surface portion.

9. The vehicle side mirror according to claim 8, wherein the first and second pivot surface portions are disposed on opposite sides of the first fastener hole.

10. A vehicle side mirror assembly for a vehicle comprising:
a door panel having an inner door panel and an outer door panel, a cavity being defined between the inner and outer door panels; and
a vehicle side mirror connected to the door panel, the vehicle side mirror including
a base member;
a mirror housing movably connected to the base member, the mirror housing including a mirror; and
a mounting bracket connected to the base member, the mounting bracket including
a pivot surface on which the mounting bracket is configured to pivot on the outer door panel during installation of the vehicle side mirror;
a flexible attachment member configured to secure the mounting bracket to the outer door panel after being pivoted on the pivot surface, the pivot surface being disposed below the flexible attachment member;
a first fastener hole disposed in the mounting bracket; and
a first fastener received by the first fastener hole in the mounting bracket, the base member, and the inner door panel to secure the vehicle side mirror to the door panel.

11. The vehicle side mirror assembly according to claim 10, wherein
a second fastener hole is disposed in the mounting bracket; and
a second fastener is received by the second fastener hole in the mounting bracket, the base member, and the inner door panel to secure the vehicle side mirror to the door panel, the first and second fasteners being installed in opposite directions.

12. The vehicle side mirror assembly according to claim 10, wherein
a support member extends downwardly from the pivot surface, the support member being disposed in the cavity when the pivot surface is pivoted on the outer door panel.

13. The vehicle side mirror assembly according to claim 10, wherein
the mounting bracket includes a wire support member disposed lower than the pivot surface, the wire support member receiving an electrical wire supplying electrical power to the vehicle side mirror.

14. The vehicle side mirror assembly according to claim 10, wherein
the pivot surface extends outwardly from an outer surface of the mounting bracket.

15. The vehicle side mirror assembly according to claim 14, wherein
the mounting bracket is disposed between the base member and a sealing member.

16. The vehicle side mirror assembly according to claim 10, wherein
the flexible attachment member has a contact surface contacting the outer door panel after pivoting the mounting bracket on the outer door panel.

17. A vehicle side mirror assembly for a vehicle comprising:
a door panel having an inner door panel and an outer door panel, a cavity being defined between the inner and outer door panels; and
a vehicle side mirror connected to the door panel, the vehicle side mirror including
a base member;
a mirror housing movably connected to the base member, the mirror housing including a mirror; and
a mounting bracket connected to the base member, the mounting bracket including
a pivot surface on which the mounting bracket is configured to pivot on the outer door panel during installation of the vehicle side mirror;
a flexible attachment member configured to secure the mounting bracket to the outer door panel after being pivoted on the pivot surface, the pivot surface being disposed below the flexible attachment member;
a fastener hole disposed in the mounting bracket; and a fastener received by the fastener hole in the mounting bracket, the base member, and the inner door panel to secure the vehicle side mirror to the door panel, the pivot surface including a first pivot surface portion and a second pivot surface portion, the first and second pivot portions being disposed on opposite sides of the fastener hole, respectively.

\* \* \* \* \*